Oct. 18, 1938.　　E. A. SPERRY, JR., ET AL　　2,133,725
FLAW DETECTOR FOR ELECTRICAL CONDUCTORS
Filed Feb. 12, 1932　　2 Sheets-Sheet 1

INVENTORS
ELMER A. SPERRY, JR.
FRANCIS HENRY SHEPARD, JR
BY
Joseph N. Lipschutz
ATTORNEY Oct. 18, 1938.  E. A. SPERRY, JR., ET AL  2,133,725
FLAW DETECTOR FOR ELECTRICAL CONDUCTORS
Filed Feb. 12, 1932  2 Sheets-Sheet 2
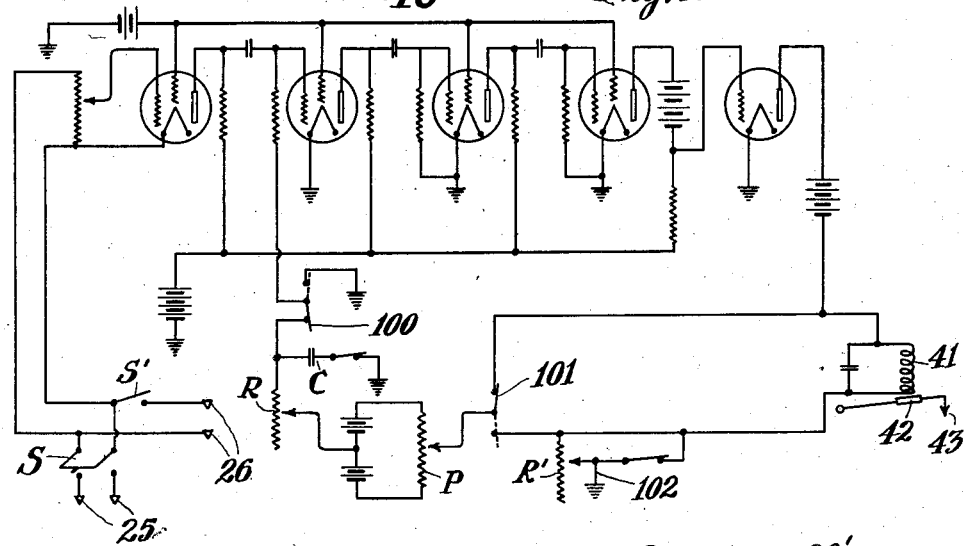
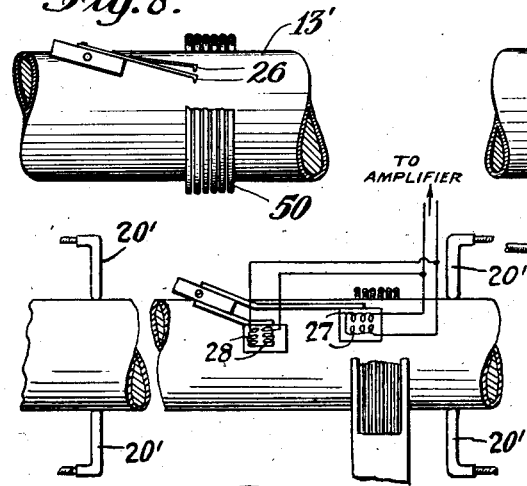
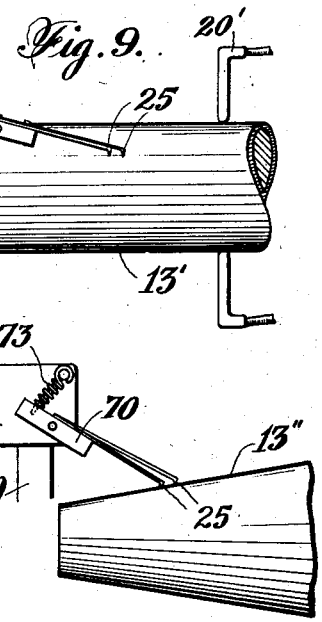
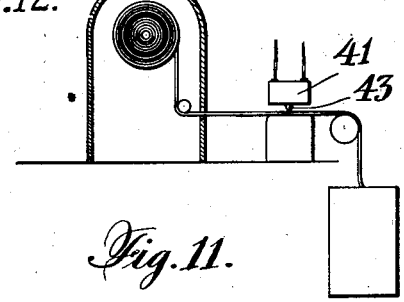
INVENTORS
ELMER A. SPERRY, JR.
FRANCIS HENRY SHEPARD, JR.
BY
Joseph H. Lipschutz
ATTORNEY Patented Oct. 18, 1938

2,133,725

UNITED STATES PATENT OFFICE

2,133,725

FLAW DETECTOR FOR ELECTRICAL CONDUCTORS

Elmer A. Sperry, Jr., Brooklyn, and Francis Henry Shepard, Jr., New Rochelle, N. Y., assignors to Sperry Products, Inc., Brooklyn, N. Y., a corporation of New York Application February 12, 1932, Serial No. 592,524

14 Claims. (Cl. 175—183)

This invention relates to a method of and means for testing electrical conductors having surfaces of revolution, such as conical and cylindrical pipes, lead sheaths, shafts and the like, for surface and internal flaws.

It is now well known through Sperry Patents Nos. 1,804,380 and 1,820,505 that electrical conductors can be tested for flaws by passing electric current therethrough and then detecting variations in the characteristics of current flow either by measuring the voltage drop due to increased resistance caused by a flaw, or else exploring the electromagnetic field surrounding the conductor by means of induction coils to detect any displacement of the current axis caused by a flaw. Difficulties arise, however, when it is attempted to apply these methods to testing cylindrical and conical objects such as lead sheaths or cables, pipes, and the like, wherein the entire circumference must be explored.

For this purpose, we propose to adapt the methods shown in the said patents to this particular use by causing the detector unit to travel in a spiral path around the conductor. This may be accomplished by providing relative rotary as well as relative longitudinal or axial movement between the conductor being tested and the detector unit. The pitch of the spiral may be varied according to circumstances so that the entire surface may be tested by this method of operation.

It is another object of our invention to provide means whereby both transverse and longitudinal defects may be readily detected.

In detecting devices of the type here employed, there is utilized a thermionic amplifier for multiplying the small variations in the characteristics of current flow caused by defects. The input of the amplifier must be held constant as to all factors except those due to the defects mentioned, otherwise errors in indication will be introduced. Such changes in input may be caused by heating or other changing characteristics during testing of the transformers, coils, or article being tested, or by the battery voltage drop. It is a further object of our invention, therefore, to provide an automatic sensitivity control for the amplifier which will eliminate from the detecting system all indications arising from changes in input not due to defects in the material being tested.

In the accompanying drawings,

Fig. 7 is a wiring diagram illustrating our automatic sensitivity control.

Fig. 8 is a view similar to Fig. 2 but showing only the means for detecting principally longitudinal defects.

Fig. 9 is a view similar to Fig. 2 but showing only the means for detecting principally transverse defects.

Fig. 10 is a view similar to Fig. 9 showing the detector means applied to a conical surface.

Fig. 11 is an elevation of a modified form of the recording mechanism.

Fig. 12 is a view similar to Fig. 2 but showing another modification of our invention.

Figure 1:
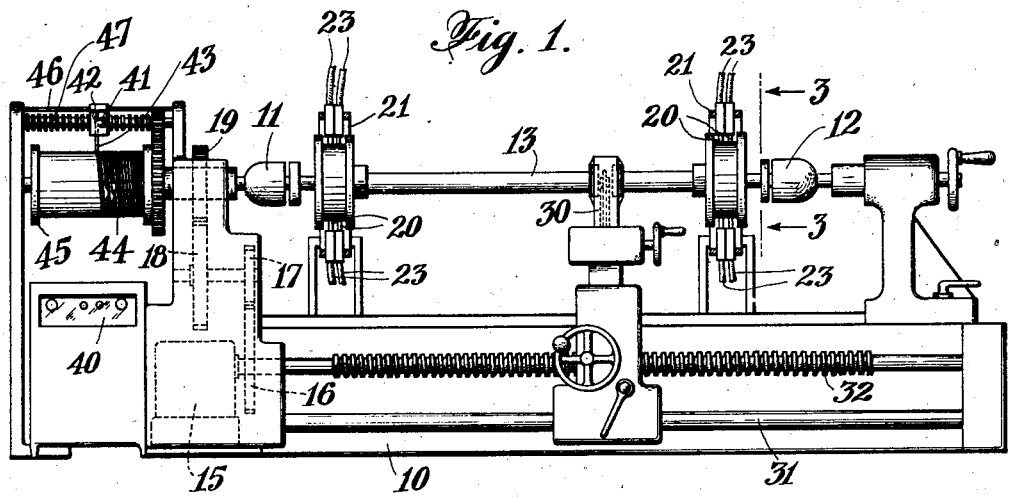
Fig. 1 is a side elevation of one form of our invention in which the conductor rotates while the detector unit travels axially or longitudinally.

In the Fig. 1 form of the invention, a cable, pipe, shaft or similar conductor to be tested is mounted in a machine 10 similar to a lathe having spindle blocks 11 and 12 for holding the conductor 13 in position for rotation. The rotation of the conductor may be accomplished by any suitable means such as motor 15 operating through suitable gearing 16—19.

The method of flaw detection employed here consists in sending current through the conductor and measuring the variations in the characteristics of current flow caused by defects in said conductor. For energizing the conductor, we may provide, in one form of our invention, a plurality of contacts 20 pivotally supported in a frame 21 and pressed by springs 22 into firm engagement with the cylindrical member at a plurality of points around its circumference in order to insure good contact. Said contacts 20 are connected through cables 23 to a generator (not shown) which supplies a current of preferably large amperage to the conductor 13 as the same is rotated.

The detector mechanism for detecting flaws may consist, in this form of the invention, of a pair of relatively sharp contacts 25 (see Fig. 4) in engagement with the periphery of member 13 and spaced so as to measure the potential drop between two points along the axis of the conductor under test. Means are provided for moving the said pair of contacts 25 axially of the member 13 while the latter is rotated so that a continuous spiral testing path is traced by said contacts on the periphery of member 13. The rate of axial movement of contacts 25 will, of course, determine the pitch of the threads of the spiral and this pitch may be varied in accordance with the type of defect one is seeking to detect. The axial movement of contacts 25 is provided by mounting said contacts in a support 30 which is carried on a guide-rod 31. For effecting movement of said support 30 and said contacts, a screw 32 is threaded through the support, and said screw may be rotated from the same motor 15 as accomplishes the rotation of the test member 13. By this means, the support 30 and contacts 25 will be fed longitudinally of conductor 13.

Figures 4, 5, 6:
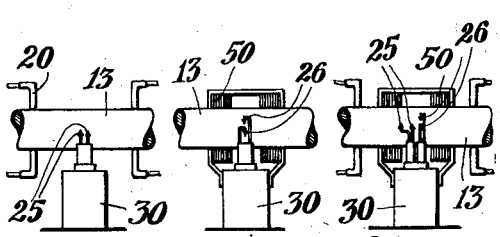
Fig. 4 is an enlarged view, partly sectioned vertically of a form of energizing and detector unit adapted especially for detecting transverse defects when the object under test is rotated.
Fig. 5 is a view similar to Fig. 4 of a mechanism especially adapted for detecting mainly longitudinal defects.
Fig. 6 is a view similar to Figs. 4 and 5 showing a combination unit which is adapted for detecting either transverse or longitudinal defects.

The spacing of the contact members 25 axially of the member under test is most efficient for the purpose of detecting mainly transverse flaws (see Fig. 4). If it is desired to detect mainly longitudinal flaws, another set of contacts 26 spaced radially with respect to the test piece 13 (see Fig. 5) may be provided. In this case, current is supplied to the test piece 13 preferably by an induction coil 50.

A testing unit may be provided, as shown in Fig. 6, combining the features of the Figs. 4 and 5 forms. Switches S and S' (see Fig. 7) enable one set of contacts or the other to be rendered effective, depending upon the type of flaw which it is desired to detect.

While potential contacts have been shown and described as the detector unit, it will be understood that the variations in the characteristics of current flow may be detected by induction coils, as shown in said Patent No. 1,820,505. Thus, in Fig. 12 I have shown the set of contacts 25 replaced by a pair of opposed induction coils 27 and the set of contacts 26 replaced by a pair of opposed induction coils 28, said pairs of induction coils being arranged so that the axes of one pair are at right angles to the axes of the other pair. This arrangement of coils enables the detection of variations in flux in two planes, namely, the plane of flux set up by the current contacts 20' which is at right angles to the plane of flux set up by the induction coil 50.

In testing conical objects (see Fig. 10) the current could be supplied by contact members 26 and the induction coil would not be present. The contacts 25 would be carried by a bar 70 (see Fig. 2) pivoted on a bracket 71 fixed to post 30. Said bar is spring-pressed by spring 73 so as to maintain contacts 25 continually in engagement with the conical surface 13'' being tested regardless of the varying diameter of the latter.

The small potential picked up by the contacts 25 or 26 may be amplified by the amplifier 40, the output of which may control a relay 41. When a flaw is encountered, the potential drop increases sufficiently so that when amplified by amplifier 40 the output will be strong enough to cause relay 41 to be energized to attract its armature 42 which carries a pen 43 in engagement with a chart 44 on a rotating cylinder 45. Said relay and pen may be fed axially along said cylinder 45 by means of a guide-rod 46 on which said relay and pen unit is supported and by means of a screw 47 extending through said unit. Said screw 47 and said cylinder 45 may be rotated from the motor 15 by suitable gearing as shown. The pen thus traces a spiral line on the chart 44 which corresponds to the spiral path travelled by the contacts on the member 13 under test. When the chart 44 is taken off the cylinder there is a developed picture of the condition of the member 13.

If this is not desired, there may be employed a tape form of recorder which moves continuously beneath the pen 43 and any flaws will be indicated by a notch in the continuous line similar to those made on the chart 44.

Figure 2:
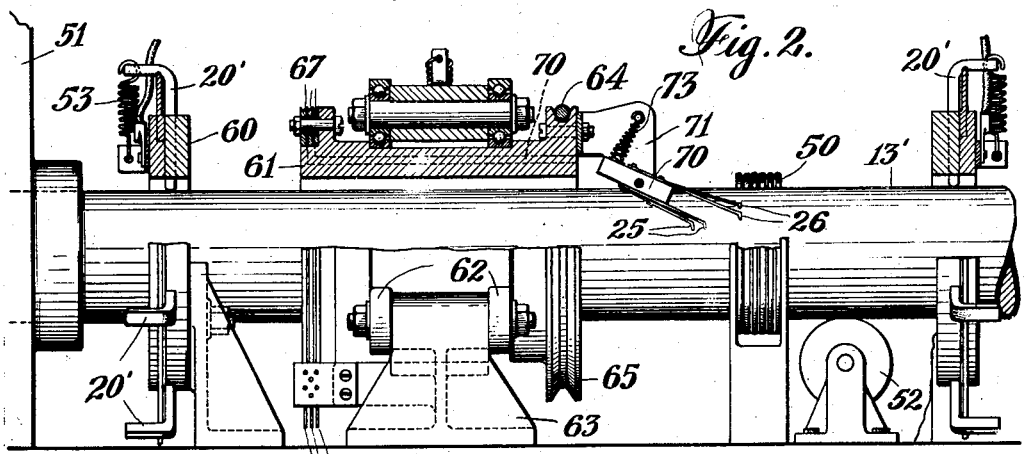
Fig. 2 is a view similar to Fig. 1 of our invention applied to the testing of lead cables as they come from the cable-forming machine, the cable traveling axially or longitudinally while the detector unit is rotated.
Figure 3:
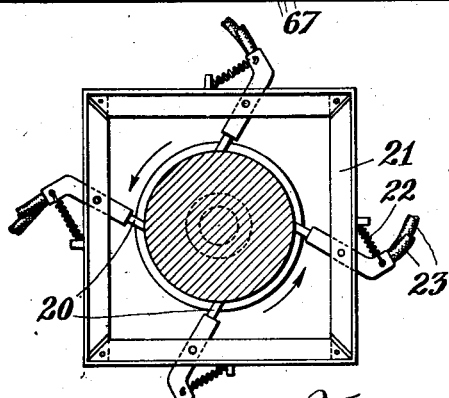
Fig. 3 is a section taken on the line 3—3 of Fig. 1 and showing the mounting for the current brush contacts.

In Fig. 2 we have illustrated a modification of our invention wherein the member under test travels axially or longitudinally while the detecting unit is rotated. The contacts describe the same spiral path, therefore, relative to the conductor under test, as in the Fig. 1 form wherein the cylindrical member under test was rotated and the contacts moved axially. In this case, the invention is shown as applied to the testing of lead cables 13' as said cables emerge from the cable-forming machine 51. Said cables travel at a substantially constant speed out of said machine and over a supporting pulley 52 after which they are wound upon the well known large reels. The current may be put into said cable for testing purposes by means of contacts 20' which are slidably mounted in a block 60 and are pressed into engagement with the cable by means of springs 53. In this case, also, energization may be accomplished by means of an induction coil 50. The set of contacts 25 may be employed alone, as shown in Fig. 9, or the contacts 26 may be employed alone, as shown in Fig. 8, or they may both be mounted for use, as shown in Fig. 2, in exactly the same manner as hereinbefore described in connection with the Fig. 1 device.

For rotating the detecting unit, we may provide a cylinder 61 to which is fixed said contacts 25 and 26, the said cylinder being mounted on bearing rollers 62 supported in a base 63. The said cylinder 61 may be rotated by being driven from any suitable driving means through such driving connection as belt 64 and pulley 65 movable integrally with the cylinder. The connections from the contacts 25 and 26 to the amplifier are made by means of leads (not shown) adapted to extend through a conduit 70 in said cylinder 61 to slip rings 67 so that the potential difference may be taken off by brushes and conducted to the amplifier 40.

By reference to Fig. 7 it will be apparent that the output actuates the pen to give an indication of flaw in response to the E. M. F.'s impressed on the input side of the amplifier. Such input variations may be due not only to variations in the characteristics of current flow as hereinbefore described, but also to such factors as heating of the transformer, which energizes coil 50, heating of the coil 50 or the lead sheath being tested, or the output may be varied by variations in amplification due to battery voltage drop and many other factors. We provide means whereby the pen will be actuated only in response to input due to variations in the characteristics of current flow and not to any of the other factors mentioned. In this connection, it may be pointed out that the variations in input due to variations in the characteristics of current flow are of very short duration, in fact, almost instantaneous, while the variations in input due to any of the other factors mentioned are of relatively long duration.

We therefore modify the amplifying system as by tapping the negative side of the output and causing such negative potential to be varied by means of the potentiometer P and the rate of current flow to be cut down by means of a resistance R and caused to charge a condenser C. The condenser C is connected to the grid of one of the tubes to place a negative bias thereon to vary the amplification factor of the tube. Because of the potentiometer P, resistance R and condenser C it will be seen that a time lag is introduced because a negative potential can be placed upon the grid of the tube only to the extent that the condenser is being charged. Therefore, variations in the input due to such factors as heating of the transformer, coil, or the object being tested, which extend over a relatively long period of time will cause a negative bias to be built up on the grid which will vary the amplification of the tube, and therefore of the set, to compensate for the input variations which such factors introduce. A variation in input due to a flaw, however, lasts for only a relatively brief period of time and the output of such a brief period will not be of sufficient duration to cause appreciable charging of condenser C and hence placing of a negative potential on the grid so that there is no measurable counteracting of the input due to flaws. In this manner, we are able to distinguish between variations of input due to flaws and variations of input due to any other factor, such as those hereinbefore enumerated. It will also correct for the changing current density in various parts of the object under test in the case where such object is conical.

The correcting mechanism described above may be put into or out of operation by means of a switch 100 which in the full line position shown is effective to place the tapped negative potential on the tube. Another switch 101 provides means in the full line position for tapping a relatively large negative potential but in the dotted line position taps a much smaller potential by reason of the shunt ground connection 102 including the resistance R'.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a flaw detector apparatus for electrical conductors, means for continuously passing current through said conductor, detector means including a plurality of axially spaced contacts for detecting variations in the characteristics of current flow caused by flaws, means for relatively rotating said conductor and detector means, and means for simultaneously relatively moving said conductor and detector means axially.

2. In a flaw detector apparatus for electrical conductors, means for continuously passing current through said conductor, detector means including a plurality of radially spaced contacts for detecting variations in the characteristics of current flow caused by flaws, means for relatively rotating said conductor and detector means, and means for simultaneously relatively moving said conductor and detector means axially.

3. In a flaw detector apparatus for electrical conductors, means for continuously passing current through said conductor, detector means including a plurality of contacts, certain of said contacts being spaced axially and certain of said contacts being spaced radially, for detecting variations in the characteristics of current flow caused by flaws, means for relatively rotating said conductor and detector means, and means for simultaneously relatively moving said conductor and detector means axially.

4. In a flaw detector apparatus for electrical conductors, means for feeding said conductor axially, means for continuously energizing successive portions of said conductor by passing current therethrough, means for detecting variations in the characteristics of current flow caused by flaws, and means for continuously rotating said detector means around the energized portion of said conductor.

5. In a flaw detector apparatus for an electrical conductor having a surface of revolution of varying diameters, means for continuously energizing a portion of said conductor by passing current therethrough, means for detecting variations in the characteristics of current flow caused by flaws, means for causing said detecting means to travel in a spiral path around said conductor, and means whereby said detecting means adjusts itself in accord with the variations in diameter of said conductor.

6. In a flaw detector apparatus for an electrical conductor having a surface of revolution of varying diameters, means for continuously energizing a portion of said conductor by passing current therethrough, means for detecting variations in the characteristics of current flow caused by flaws, means for relatively rotating said conductor and detecting means, means for simultaneously relatively moving said conductor and detecting means axially and means whereby said detecting means adjusts itself in accord with the variations in diameter of said conductor.

7. In a flaw detector apparatus for electrical conductors having surfaces of revolution, means for continuously passing current through said conductor, detector means for detecting variations in the characteristics of current flow caused by flaws, means for amplifying said variations, and means whereby said amplifying means is rendered responsive only to input of the type due to said variations.

8. In a flaw detector apparatus for electrical conductors having surfaces of revolution, means for continuously passing current through said conductor, detector means for detecting variations in the characteristics of current flow caused by flaws, means for amplifying said variations, said variations being of the short-period type of input, and means whereby said amplifying means is rendered responsive only to short-period input.

9. In a flaw detector apparatus for electrical conductors having surfaces of revolution, means for continuously passing current through said conductor, detector means for detecting variations in the characteristics of current flow caused by flaws, means for amplifying said variations including a plurality of amplifying tubes, and means whereby said amplifying means is rendered responsive only to input of the type due to said variations, said last-named means including means for impressing a bias on said tubes for neutralizing the input of other types of variations.

10. In a flaw detector apparatus for electrical conductors having surfaces of revolution, means for continuously passing current through said conductor, detector means for detecting variations in the characteristics of curent flow caused by flaws, means for amplifying said variations including a plurality of amplifying tubes, and means whereby said amplifying means is rendered responsive only to input of the type due to said variations, said last-named means including means connecting the output of said amplifying means with said tubes for impressing a bias on said tubes for neutralizing the input of other types of variations.

11. In a flaw detector apparatus for electrical conductors having surfaces of revolution, means for continuously passing current through said conductor, detector means for detecting variations in the characteristics of current flow caused by flaws, means for amplifying said variations, said variations being of the short-period type of input, and means whereby said amplifying means is rendered responsive only to short-period input, said last-named means including means whose operation is a function of the time for impressing a bias on said tubes for neutralizing the long-period type of input.

12. In a flaw detector apparatus for electrical conductors having surfaces of revolution, means for continuously passing current through said conductor, detector means for detecting variations in the characteristics of current flow caused by flaws, means for amplifying said variations, said variations being of the short-period type of input, and means whereby said amplifying means is rendered responsive only to short-period input, said last-named means comprising means including a condenser for impressing a bias on said tubes for neutralizing the long-period type of input.

13. In a flaw detector apparatus for an electrical conductor having a surface of revolution, means for continuously energizing a portion of said conductor by passing current therethrough, means for detecting variations in the characteristics of current flow caused by flaws, means for relatively rotating said conductor and detecting means and means for simultaneously relatively moving said conductor and detecting means axially.

14. The method of detecting defects in a metallic object, which consists in successively passing fluxes in different directions and in different planes through the same portion of the object and in comparing quantities responsive to change in the fluxes.

ELMER A. SPERRY, Jr.
FRANCIS HENRY SHEPARD, Jr.